(12) United States Patent
Hasek et al.

(10) Patent No.: US 12,238,103 B2
(45) Date of Patent: *Feb. 25, 2025

(54) AIR GAP-BASED NETWORK ISOLATION DEVICE

(71) Applicant: Goldilock Secure Limited, Wolverhampton (GB)

(72) Inventors: Anthony Hasek, Ricany (CZ); Richard Bate, Staffordshire (GB)

(73) Assignee: Goldilock Secure Limited, Wolverhampton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,151

(22) Filed: Sep. 3, 2021

(65) Prior Publication Data
US 2022/0060476 A1 Feb. 24, 2022

Related U.S. Application Data

(63) Continuation-in-part of application No. 16/016,488, filed on Jun. 22, 2018, now Pat. No. 11,115,390.
(Continued)

(51) Int. Cl.
*H04L 9/40* (2022.01)
*H04L 69/18* (2022.01)

(52) U.S. Cl.
CPC .............. *H04L 63/10* (2013.01); *H04L 63/08* (2013.01); *H04L 63/164* (2013.01); *H04L 69/18* (2013.01)

(58) Field of Classification Search
CPC ....... H04L 63/10; H04L 63/08; H04L 63/164; H04L 69/18; H04L 63/0209; H04L 63/12
See application file for complete search history.

(56) References Cited

U.S. PATENT DOCUMENTS

| 6,594,762 B1 | 7/2003 | Doub |
|---|---|---|
| 8,984,257 B2 | 3/2015 | Ozgit |

(Continued)

FOREIGN PATENT DOCUMENTS

| CN | 105721476 B | 6/2016 |
|---|---|---|
| CN | 106572101 | 4/2017 |

(Continued)

OTHER PUBLICATIONS

Examination Report dated Sep. 22, 2022, Application No. GB2204921.7 5 pages.
(Continued)

*Primary Examiner* — Masud K Khan
(74) *Attorney, Agent, or Firm* — Mahamedi IP Law LLP

(57) ABSTRACT

A network isolation device includes an internal network interface to connect the network isolation device to an internal network and an external network interface to connect the network isolation device to an external network. The network isolation device further includes an airgap device that operates to (i) close an air gap to connect the internal network to the external network, (ii) open the air gap to disconnect the internal network from the external network. The device further includes a signal receiver that receives a signal from a signal source, and based on the signal, performs an authentication process to determine whether the signal or the signal source are authorized. In response to determining that the signal or the signal source is authorized, the receiver operates the airgap device to close the air gap and connect the internal network to the external network.

20 Claims, 9 Drawing Sheets

Related U.S. Application Data

(60) Provisional application No. 62/594,963, filed on Dec. 5, 2017.

(56) References Cited

U.S. PATENT DOCUMENTS

| | | | |
|---|---|---|---|
| 9,225,352 | B2 | 12/2015 | Kobayashi |
| 10,154,029 | B1* | 12/2018 | Griffin .................. H04L 9/0861 |
| 10,404,474 | B1 | 9/2019 | Caceres et al. |
| 10,681,793 | B1 | 6/2020 | Sanson |
| 11,115,390 | B2 | 9/2021 | Hasek |
| 11,362,844 | B1 | 6/2022 | Cook et al. |
| 11,368,437 | B2 | 6/2022 | Wimmer |
| 11,381,473 | B1 | 7/2022 | Corwin et al. |
| 11,616,781 | B2 | 3/2023 | Hasek |
| 11,997,112 | B1 | 5/2024 | Sanders |
| 2002/0053032 | A1 | 5/2002 | Dowling |
| 2003/0172145 | A1 | 9/2003 | Nguyen |
| 2004/0085941 | A1 | 5/2004 | Li |
| 2004/0260941 | A1 | 12/2004 | Fearnley et al. |
| 2006/0013382 | A1 | 1/2006 | Hoshikawa |
| 2006/0242423 | A1* | 10/2006 | Kussmaul ............. H04L 9/3247 713/182 |
| 2007/0143398 | A1 | 6/2007 | Graham |
| 2007/0260687 | A1 | 11/2007 | Rao |
| 2008/0082677 | A1 | 4/2008 | Miyazawa |
| 2009/0254572 | A1 | 10/2009 | Redlich |
| 2010/0318785 | A1 | 12/2010 | Ozgit |
| 2010/0319063 | A1 | 12/2010 | Koppolu |
| 2013/0257406 | A1 | 10/2013 | Hausman, Jr. |
| 2013/0268931 | A1 | 10/2013 | O'Hare et al. |
| 2013/0324083 | A1 | 12/2013 | Celi |
| 2014/0052864 | A1 | 2/2014 | Van Der Linden et al. |
| 2014/0119727 | A1 | 5/2014 | Ousley |
| 2014/0136671 | A1 | 5/2014 | Drake |
| 2014/0176182 | A1 | 6/2014 | Kuhn |
| 2014/0181315 | A1 | 6/2014 | Nakagawa |
| 2014/0297899 | A1* | 10/2014 | Chang .................. G06F 9/4413 710/14 |
| 2015/0024710 | A1 | 1/2015 | Becker et al. |
| 2015/0042464 | A1 | 2/2015 | Yu |
| 2015/0047058 | A1 | 2/2015 | Matthews |
| 2015/0341209 | A1 | 11/2015 | Wittenschlaeger |
| 2015/0381658 | A1 | 12/2015 | Poornachandran et al. |
| 2016/0077762 | A1 | 3/2016 | Ide |
| 2016/0180331 | A1 | 6/2016 | Tuscano |
| 2016/0337359 | A1 | 11/2016 | Hojsik |
| 2017/0195477 | A1 | 7/2017 | Jones-Mcfadden |
| 2017/0201519 | A1* | 7/2017 | Yang ..................... H04W 12/08 |
| 2017/0272984 | A1 | 9/2017 | Yu |
| 2017/0324566 | A1 | 11/2017 | Kawasaki et al. |
| 2018/0007021 | A1 | 1/2018 | Deriso |
| 2018/0019999 | A1 | 1/2018 | Naegle et al. |
| 2018/0176776 | A1* | 6/2018 | Knaappila ............. H04W 76/14 |
| 2018/0211036 | A1 | 7/2018 | Zlotnik |
| 2018/0213002 | A1 | 7/2018 | Figovsky |
| 2018/0234437 | A1 | 8/2018 | McGaughey |
| 2018/0337948 | A1* | 11/2018 | Chu .................... H04L 63/0428 |
| 2018/0338017 | A1* | 11/2018 | Mekuria ............. H04L 67/1097 |
| 2019/0068617 | A1 | 2/2019 | Coleman et al. |
| 2019/0098007 | A1 | 3/2019 | Coleman et al. |
| 2019/0114405 | A1 | 4/2019 | Shibata |
| 2019/0141540 | A1* | 5/2019 | Thubert ............... G05D 1/0274 |
| 2019/0173853 | A1 | 6/2019 | Hasek |
| 2019/0190891 | A1 | 6/2019 | Pillai et al. |
| 2019/0268165 | A1 | 8/2019 | Monica |
| 2019/0312752 | A1 | 10/2019 | Nogueira-Nine |
| 2019/0348232 | A1 | 11/2019 | Chen |
| 2020/0065502 | A1 | 2/2020 | Lockman |
| 2020/0120136 | A1 | 4/2020 | Gadhe et al. |
| 2020/0145420 | A1 | 5/2020 | Haletky et al. |
| 2020/0145434 | A1 | 5/2020 | Haletky |
| 2020/0204435 | A1 | 6/2020 | Matsui |
| 2020/0204656 | A1 | 6/2020 | Lee |
| 2020/0252273 | A1 | 8/2020 | Kay |
| 2020/0285734 | A1* | 9/2020 | Zamir .................. H04L 61/5014 |
| 2020/0304482 | A1 | 9/2020 | Nissan |
| 2020/0342109 | A1 | 10/2020 | Wright |
| 2020/0365345 | A1 | 11/2020 | Telefus |
| 2020/0396911 | A1 | 12/2020 | Stouffer |
| 2021/0014229 | A1 | 1/2021 | Beveridge |
| 2021/0044563 | A1* | 2/2021 | Reyes ................... G06F 21/564 |
| 2021/0110068 | A1 | 4/2021 | Voss |
| 2021/0127244 | A1* | 4/2021 | Choi ..................... H04W 84/18 |
| 2021/0136644 | A1 | 5/2021 | Park |
| 2021/0141893 | A1 | 5/2021 | Soman |
| 2021/0173907 | A1 | 6/2021 | Keith, Jr. |
| 2021/0176235 | A1 | 6/2021 | Keith, Jr. et al. |
| 2021/0224374 | A1 | 7/2021 | Fong |
| 2021/0250333 | A1 | 8/2021 | Negrea |
| 2022/0094686 | A1 | 3/2022 | Jain |
| 2022/0150280 | A1 | 5/2022 | Azulay et al. |
| 2022/0182833 | A1 | 6/2022 | Draper |
| 2022/0286441 | A1 | 9/2022 | Kuehnel |
| 2022/0326929 | A1 | 10/2022 | Sharma et al. |
| 2022/0345457 | A1 | 10/2022 | Jeffords et al. |
| 2022/0353256 | A1 | 11/2022 | Cizer Kobrinsky et al. |

FOREIGN PATENT DOCUMENTS

| | | |
|---|---|---|
| EP | 2317450 | 5/2011 |
| WO | WO-01/95069 | 12/2001 |
| WO | WO-2005/101724 | 10/2005 |
| WO | WO-2019/113237 | 6/2019 |
| WO | WO-2019243657 A1 * | 12/2019 |

OTHER PUBLICATIONS

International Search Report and The Written Opinion of The International Searching Authority mailed Dec. 23, 2022, for related PCT Application No. PCT/GB2022/052250 filed Sep. 2, 2022, 19 pages.

International Search Report and The Written Opinion of The International Searching Authority mailed Mar. 14, 2019, for related PCT Application No. PCT/US18/064105 filed Dec. 5, 2018, 8 pages.

* cited by examiner

AIR GAP-BASED NETWORK ISOLATION DEVICE

CROSS-REFERENCE TO RELATED APPLICATIONS

This application is a continuation-in-part of U.S. patent application Ser. No. 16/016,488, filed on Jun. 22, 2018; which claims benefit of priority to Provisional U.S. Patent Application No. 62/594,963, filed on Dec. 5, 2017; the aforementioned applications being hereby incorporated by reference in their respective entireties.

TECHNICAL FIELD

Examples include a storage system that utilizes discrete on-demand memory resources.

BACKGROUND

There are increasingly greater amounts of data which are sensitive and personal to individuals. For example, people increasingly rely on passwords for a variety of purposes, and passwords are increasingly more complex and difficult to member. People also digitize important documents, such as birth certificates and other documentation. More recently, there is increasing use of cryptocurrencies. When managing and transacting with cryptocurrencies, people need to use private keys to ownership and sign transactions. People often store such sensitive and valuable information on their computers, on $3^{rd}$ party internet sites, or on personally-held hardware devices. Hardware or PC storage leaves the individuals vulnerable when their devices are lost, stolen, or hacked. Another solution is for individuals to store sensitive data in the "cloud" (e.g., network account), but online accounts can be accessed without authorization, though traditional hacking or, for example, man-in-the-middle attacks.

DETAILED DESCRIPTION

Figure 1:
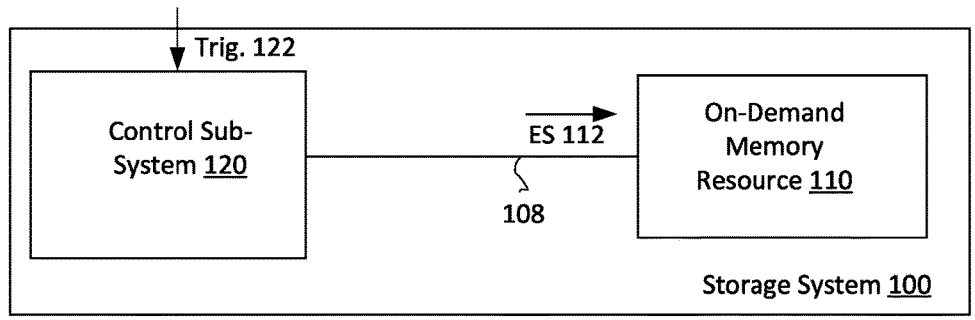
FIG. 1 illustrates an example storage device to persistently store a sensitive data set.

According to examples, a storage device includes a discrete memory resource and a controller. The memory resource may have a characteristic of existing in each of an off-state and an on-state. The memory resource may be structured to persistently store a sensitive data set when in the off-state, and to enable read and/or write access only when in the on-state. The controller may be coupled to the memory resource to provide an electrical signal to the memory resource in response to an external trigger signal. The electrical signal may cause the memory resource to switch from the off-state into the on-state for a duration that is based on, for example, one or more of (i) a duration of the external trigger signal, (ii) a predetermined duration that is triggered with the external trigger signal, and/or (iii) an occurrence of an ending event, following the external trigger signal. The controller may enable at least one of a read or write operation while the memory resource is in the on-state.

In some variations, the controller controls switching of the memory resource between the on and off states. For example, the controller can switch the memory resource into the on-state by manipulating the memory resource to physically contact a signal line for electrical input. Likewise, the controller may switch the memory resource into the off-state by manipulating the memory resource to separate, or otherwise form an airgap with the signal line for the electrical input. In such examples, the controller may be remotely accessible to a user using a non-IP (Internet Protocol) communication channel (e.g., Public Switch Telephone Network (PSTN)). When accessed, the controller switches the memory resource to the on-state, enabling the memory resource to be remotely accessible over an IP channel. In the on-state, the memory resource can receive and implement read and write operations using the IP channel.

Still further, in some variations, a storage system includes a call router to receive incoming telephone calls, and multiple on-demand discrete memory resources. The call router receives incoming telephone calls, and for each incoming telephone call, the call router selects a discrete memory resource based on caller information provided with the respective incoming call. Each discrete memory resource may be structured to persistently store a sensitive data set when in the off-state, and to enable read and/or write access only when in the on-state.

In some examples, a method for operating a storage device includes receiving an incoming telephone call, and selecting a discrete memory resource from a plurality of discrete memory resources based on caller information of the incoming telephone call. Additionally, an example includes providing an electrical input signal to the selected discrete memory resource, where the electrical input signal causes the discrete memory resource to be accessible for a duration that can be determined by, for example, one or more of the incoming telephone call, timer, or the occurrence of one or more events (e.g., start and ending events).

In other examples, a storage system or device selects a memory resource component from an array of memory resources components, where each memory resource component is not accessible over the Internet until that memory resource component is switched from an unconnected state into a connected state. When in the unconnected state, the memory resource component is not accessible over a data network such as the Internet. When in the connected state, the selected memory resource component becomes accessible over the data network (e.g., over the Internet). When in the connected state, the memory resource component may also be said to be activated (as opposed to deactivated). The storage system or device generates a trigger signal that activates the selected memory resource component, such that the activated memory resource component is accessible over a data network that includes the Internet for a given duration.

As described with various examples, the transition from an unconnected state to a connected state may coincide with a state change of a corresponding switch (e.g., airgap switch). By way of example, the state change of the corresponding switch may connect the selected memory resource component to a network communication resource (e.g., gateway), which makes the memory resource component accessible over a data network (e.g., Internet Protocol network). In variations, the state change of the corresponding switch may connect the selected memory resource component to a power source, which then makes the memory access component accessible over a data network.

According to examples, the selection of the memory resource component can be based on information provided with or determined from the incoming call. For example, the selection of the memory resource can be based on a phone number that is specified by the call (e.g., the dialed phone number), a code which the caller specifies when a call is connected, and/or a phone number of the caller.

Further described herein is an air gap-based network isolation device that includes hardware componentry for isolating downstream networks and computing devices from external networks. The network isolation device includes an out-of-band receiver coupled to an airgap control device—such as a mechanical relay, an actuator, or an optocoupler—that closes and opens a physical air gap in response to an out-of-band signal. For example, an internal network (e.g., an Ethernet network utilizing an Internet Protocol (IP)) may be isolated from other networks (e.g., the Internet) using the network isolation device as an access point to the internal network. As an example, the internal network can be comprised of computing devices, memory resources, and/or other digital assets of an entity that desires increased security to isolate its computing devices from other networks in an on-demand manner.

The network isolation device includes an internal network interface, such as a universal serial bus (USB) and/or R345 port, that connects the network isolation device to the internal network. The network isolation device further includes a second network port (e.g., on an opposing end of the device) that connects the network isolation device to an external network, such as the Internet. The network isolation device can further include circuitry comprising a signal receiver controlling a device that opens and closes an air gap. In accordance with examples described herein, the signal receiver can comprise a telephone receiver, a cellular receiver, a radio signal receiver, a LoRa receiver, or any suitable non-IP receiver.

In various implementations, the signal receiver can include a dedicated hardware signal filter that provides an initial analog authentication layer for incoming access signals (e.g., out-of-band wireless signals, such as radio, LoRa, SMS, etc., or wired signals utilizing protocols that are distinct from the external network communication protocols). In some aspects, the hardware signal filter can comprise a specialized chip (e.g., an application-specific integrated circuit (ASIC)) representing an encryption and/or decryption algorithm that prevents unwanted access to signal authentication software executing on the signal receiver. It is contemplated that utilization of a dedicated hardware authentication layer renders any attempts at unwanted access to the internal network virtually impossible. As an addition or an alternative, the signal receiver can include a digital signal processor or other processing device executing authentication instructions to authenticate the wireless access signal.

Once authenticated, the signal receiver can control the device (e.g., mechanical relay, actuator, or optocoupler) to close the air gap and provide network connectivity to the external network(s). As an on-demand device, the network isolation device can be controlled remotely using any type of out-of-band signal that corresponds to the signal receiver. As an example, the signal receiver may receive an SMS message from a particular phone number that includes a specified code for authentication. The hardware signal filter can pre-process the SMS message (e.g., verify that it came from a correct phone number or an authorized device identifier). Upon initial verification by the hardware filter, the SMS message may be further processed by the signal authenticator of the signal receiver, which can verify a secondary code embedded in the message (e.g., via a decryption algorithm). Once verified, the signal receiver can control the device to close the air gap and enable access, or open the air gap to remove access.

Among other benefits, examples recognize that a primary source of vulnerability to online accounts and digital assets is that the computers which host the accounts are continuously present and accessible on the Internet. Because these computers are accessible, attackers can garner information about the accounts which the maintain, even when the accounts are not in use. In contrast to conventional approaches which utilize computers that remain online, examples provide for a system which maintains the physical source (e.g., storage devices or memory resource components) of a user's account offline (e.g., in an off-state, or without access to data network connectivity) until the user needs access to his or her data set. By keeping such devices or components offline, examples prevent unauthorized access by, for example, attackers who could otherwise discover or probe for sources of online information.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1 illustrates an example storage system to persistently store a sensitive data set. As described with various examples, the storage system 100 includes a control sub-system 120 and a discrete, on-demand memory resource 110 that is capable of persistently storing data in an off-state. An external trigger signal can be supplied to the storage system 100, to cause the memory resource 110 to switch to an on-state for a duration that is defined by a duration of the external trigger signal 122.

The storage system 100 can store sensitive data (e.g., cryptocurrency) on a network computer system, using a respective memory resource 110 that, by default, exists in an off-state. In the off-state, the memory resource is not accessible over the IP channel. The storage system 100 can make the memory resource 110 accessible to an authorized party who can provide an external trigger signal 122 to the storage system 100. In this way, the accessibility of the memory resource 110 may be limited in time, to a duration that is based on or responsive to the control sub-system 120 receiving the external trigger signal 122. Additionally, access to the memory resource 110 may be limited to a party that can be authorized by way of generating the external trigger signal 122.

As described with some examples, the storage system 100 can be associated with a telephone number, and the external trigger signal 122 can be provided by a telephonic call. The memory resource 110 can be made accessible to a party that can be authorized by placing a telephone call using the telephone number that is associated with the storage system 100.

In more detail, the control sub-system 120 is coupled to the memory resource 110 by a signal path 108. In the off-state, a bit state of individual memory cells that comprise the memory resource 110 are static and inaccessible, meaning the bit state of the individual memory cells cannot be read or changed without application of an electrical input to the individual memory cells. In this way, the memory resource 110 is not readable or writeable when in the off-state. As described by examples, the memory resource 110 can be switched intermittingly into the on-state. When the memory resource 110 is in the on-state, the memory resource 110 can be subjected to read operations, as well as write operations which change the respective bit state of the individual memory cells that comprise the memory resource 110. Thus, in the on-state, the bit state of select memory cells of the memory resource 110 may be changed to reflect values that correspond to a sensitive data set.

The control sub-system 120 uses the signal path 108 to send an electrical signal 112 to the memory resource 110 across the signal path 108. The electrical signal 112 provides electrical input for memory cells of the memory resource 110, to enable, for example, read and write operations to be performed on the memory resource 110. In examples, the memory resource 110 is switched instantly into the on-state with application of the electrical signal 112. The control sub-system 120 can terminate the electrical signal 112, causing the memory resource 110 to switch instantly to the off-state.

According to an example, the memory resource 110 exists by default in the off-state, during which the memory cells of the memory resource 110 are inert. The control sub-system 120 provides the electrical signal 112 to the memory resource 110 upon the control sub-system 120 receiving an external trigger signal 122. In some examples, the control sub-system 120 may receive an incoming telephone call as the external trigger signal 122. In such examples, the control sub-system 120 is triggered into providing the electrical signal 112 to the memory resource 110 upon receiving an incoming call. Once the telephone call ends, the control sub-system 120 terminates the electrical signal 112, causing the memory resource 110 to return instantly to the off-state.

In variations, the memory resource 110 and the control sub-system 120 of storage system 100 are co-located on a common substrate 106, such as a circuit board. The control sub-system 120 can include resources to receive the external trigger signal 122, and to provide the electrical signal 112 to the memory resource 110 via the signal path 108. In some examples, the storage system 100 is assigned to a telephone number, and the control sub-system 120 can receive an incoming telephone call for the assigned telephone number in order to generate the electrical signal 112 for the memory resource 110.

Figure 2A:
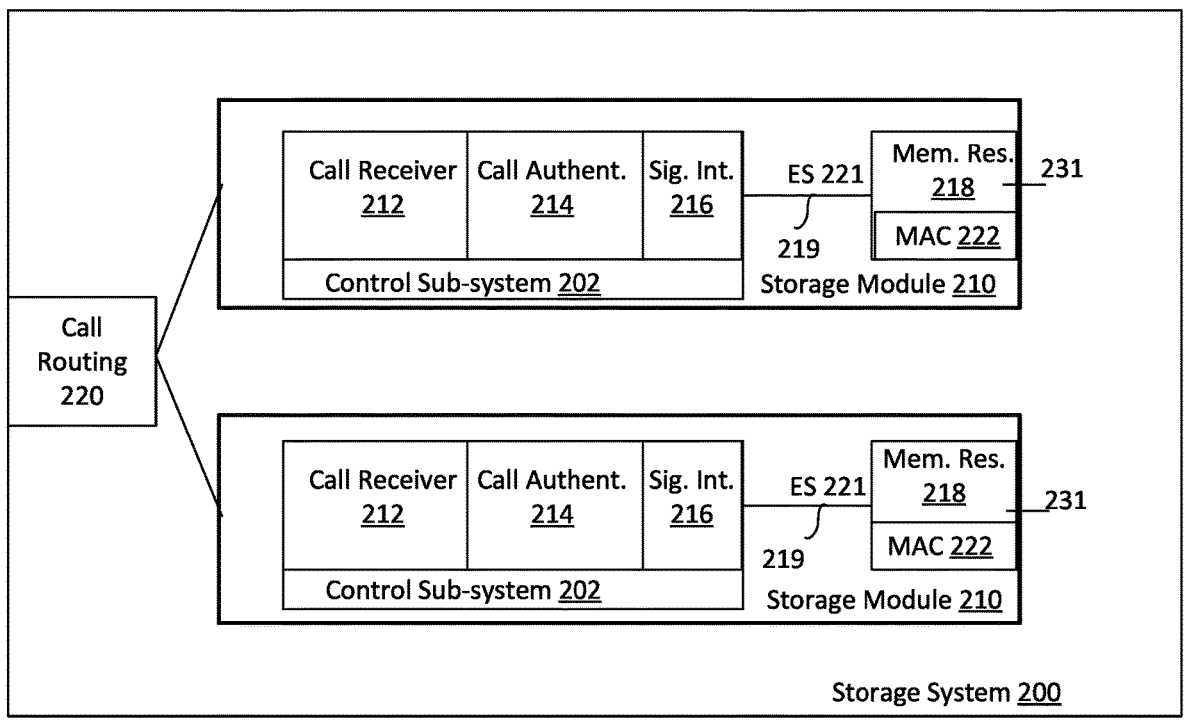
FIG. 2A illustrates an example storage system that utilizes discrete on-demand memory resources.

FIG. 2A illustrates an example storage system that utilizes discrete on-demand memory resources. In an example, a storage system 200 includes multiple storage modules 210, with each of the multiple storage modules 210 being assigned to a corresponding telephone number 215. In examples such as shown by FIG. 2A, functional components of the control sub-system 202 may be co-located with a device of storage module 210. In other variations, the control sub-system 202 can be implemented on one or more devices that are physically separated from a device of the storage module 210. For example, the control sub-system 202 can be implemented a network computer (e.g., server), separate from a substrate or computing device of the storage module 210. Still further, components described with the control sub-system 202 can be distributed, so that some functionality described is co-located with the storage module 210. In variations, the control sub-system 202 includes a call router 220 to receive and route incoming telephone calls to respective storage devices that are assigned the corresponding telephone numbers. The call router 220 may, for example, include a lookup table that matches an incoming telephone call to a storage device identifier.

In some examples, the control sub-system includes a call receiver 212, an authentication component 214, a signal interface 216 and an on-demand memory resource 218. The call receiver 212 can receive an incoming telephone call 211. In an example, the call receiver 212 connects to an incoming telephone call 211 which specifies the telephone number 215 assigned to the storage module 210. The call receiver 212 sustains the connection with incoming telephone call 211 for a duration determined by the incoming telephone call 211 (e.g., until caller hangs up).

Figure 2B:
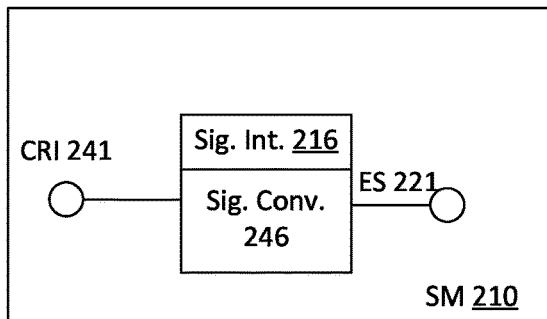
FIG. 2B through FIG. 2E illustrate variations of a signal interface, for use with storage devices such as described with examples of FIG. 1 and FIG. 2A.

FIG. 2B illustrates a first example of a signal interface for a storage module 210. As shown in FIG. 2B, each storage device 210 may be implemented so that the signal interface 216 generates an electrical input for the memory resource 218, using power drawn from, for example, the call receiver 212 when the call receiver 212 makes the call connection. The call receiver 212 may, for example, activate to generate a call receiver input 241 when an incoming phone is received. The signal interface 216 includes a signal converter 246, corresponding to, for example, circuit elements which convert the call receiver input 241 to the electrical input 221. The signal converter 246 can, for example, shape the call receiver input 241 and/or set the voltage value of the electrical input 221 based on the requirements of the memory resource 218. Once the call is received, the signal interface 216 signals the electrical input 221 over the signal line 219 to the memory resource 218, so that the memory resource is in the on-state. As described in greater detail, when the memory resource 218 is in the on-state, the memory resource 218 is accessible to a network communication channel, represented by IP channel 231. Conversely, when the memory resource 218 is in the off-state, the memory resource 218 is not active, and/or not connected to the IP channel 231.

Figure 2C:
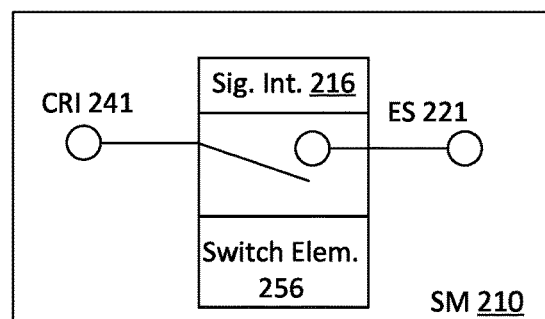

FIG. 2C illustrates another example of a signal interface for a storage module 210. In an example of FIG. 2C, the storage device 200 implements the signal interface 216 to include a switching mechanism 256 that is triggered to switch states by the call receiver 212, based on the call receiver input 241 (e.g., based on whether the incoming call is received). Prior to the incoming telephone call, the signal interface 216 may be an open switch (as shown in FIG. 2C), and once the telephone call is received by the call receiver 212, the switching mechanism 256 is closed. By way of example, the storage module 210 may use a battery or other power source to provide electrical input to the memory resource 218 over the signal line 219 when the signal interface 216 is a closed switch.

Figure 2D:
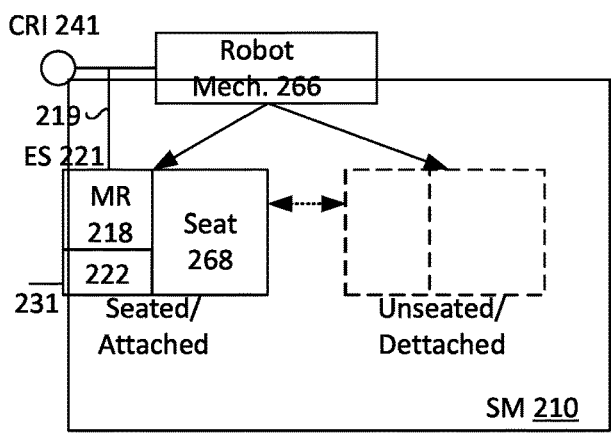

FIG. 2D illustrates another variation of a signal interface for a storage module 210. In an example of FIG. 2D, each storage module 210 implements the signal interface 216 to include a robotic mechanism 266 that includes a seat 268 (e.g., housing element) that moves (e.g., translates, rotates) or otherwise positions (e.g., aligns, orients, etc.) the memory resource 218 and/or signal line 219 with respect to one another. The robotic mechanism 266 can, for example, move the memory resource 218 (as well as the memory microprocessor 222 and IP channel 231) between a seated and unseated position. In the seated position, the memory resource 218 connects to the signal line 219 to receive electrical input 221. The electrical input 221 may be provided by various sources, such as by an external power source or battery. Thus, depending on implementation, the electrical input 221 can be persistent, or intermittent (e.g., when the call receiver 212 receives an incoming call). In such an example, the robotic mechanism 266 may maintain the seat 268 in the unseated position (or detached state), such that an airgap exists between the memory resource 218 and the signal line 219 (from which the electrical input 221 is provided). Once the telephone call is received, the robotic mechanism 266 moves the seat 268 and the memory resource 218 relative to the signal line 219 into the seated or attached state, so that the memory resource 218 switch receives electrical input 221.

Figure 2E:
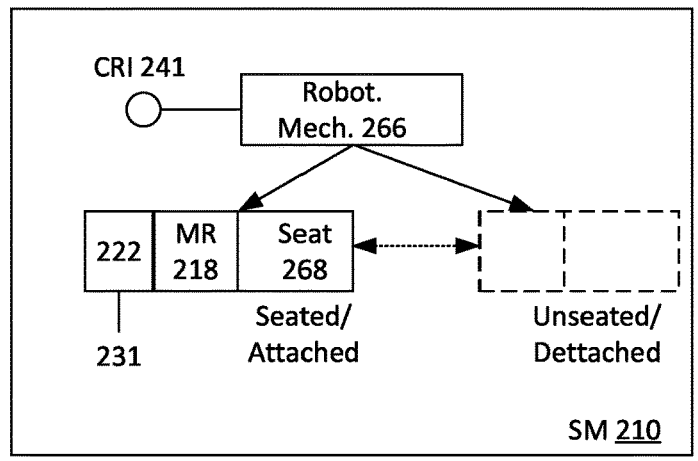

FIG. 2E illustrates another variation of a signal interface for a storage module 210. In FIG. 2E, each storage device 200 implements the signal interface 216 to include the robotic mechanism 266 connecting the memory resource 218 to the memory microprocessor 222 and/or IP channel 231 when in the seated position. By default, the robotic mechanism 266 may keep the seat 268 unseated or detached, until the call receiver input 241 is received. The call receiver input 241 triggers the robotic mechanism 266 to move the seat 268 from the unseated position (or detached state) to the seated and attached state. As described with an example of FIG. 2D, in one variation, the memory resource 218 may only receive electrical input 221 when in the seated position. As an addition or variation, FIG. 2E illustrates an example in which the memory resource 218 connects to the memory microprocessor 222 and IP channel 231 only when the seat 268 is in the seated position. This, when in the seated position, the memory resource 218 may be remotely accessible (e.g., for read and write operations) via the IP channel 231 and memory microprocessor 222. As with other examples, the duration of the seated position may be based on the call receiver input 241 (e.g., duration of incoming call). Once termination is signaled, the robotic mechanism 266 may reposition or otherwise move the seat 268 so that the memory resource 218 is not accessible via the IP channel 231.

While some examples of FIG. 2A through 2E provide for access to the memory resource 218 to be terminated based on the call receiver signal 241 (e.g., while incoming call connection is present, or call is terminated), in variations, access to the memory resource 218 may be terminated based on the occurrence of other conditions. In an example, signal interface 216 may cause the switching element (e.g., see FIG. 2C) or robotic mechanism 266 to switch states or positions in response to the occurrence of one or more multiple conditions, such as, for example, (i) a timer condition (e.g., initiated when the call receiver 212 receives incoming call, or terminates incoming call); and/or (ii) user command, provided by, for example, DTMF input or through the IP channel 231.

With further reference to an example of FIG. 2A, the authentication component 214 can include logic to authenticate an incoming call 211. The authentication component 214 may authenticate an incoming call as a trigger signal to activate the memory resource 218 based on, for example, caller information (e.g., telephone number of caller) or other metadata associated with the incoming telephone call. In variations, when the call receiver 212 connects to an incoming telephone call (specifying the corresponding telephone number associated with the storage device), the authentication component 214 uses audio information to authenticate the telephone call as the trigger signal for activating the memory resource 218. By way of example, the audio information may correspond to, for example, a voice signal or pattern, which the authentication component 214 may recognize as belonging to a specific authorized caller. Once recognized, the authentication component 214 may authenticate the incoming telephone call before the signal interface 216 is triggered to switch the memory resource 218 to the on-state.

In variations, the audio information may correspond to a spoken utterance, a dual tone multi-frequency signal ("DTMF") or another audio signal which can be recognized, or otherwise correlated to an authentication input. If the incoming telephone call is authenticated, the authentication component 214 may generate an electrical signal 221 via the signal interface 216 to activate (or switch to on-state) the memory resource 218. While the memory resource 218 is in the on-state with application of the electrical signal 221, the memory resource 218 may be accessible to read and write operations via the IP channel 231.

In some examples, read and/or write operations may be communicated for memory resource 218 when in the on-state, using a memory microprocessor 222. In an example, the memory microprocessor 222 can process read and/or write operations received through the incoming telephone call 211. For example, the read and/or operation can be communicated through a pattern or sequence of tones of the incoming telephone call 211.

As a variation, the memory microprocessor 222 can receive read and/or write operations and communicate respective responses to the operations through an alternative data channel (e.g., IP channel 231). In such examples, the network connection may thus be active when the memory resource 218 is in the on-state. In some variations, the memory microprocessor 222 may include additional security logic, such as additional authentication logic to authenticate a user who attempts to access the memory resource 218 while it is active.

Figure 3:
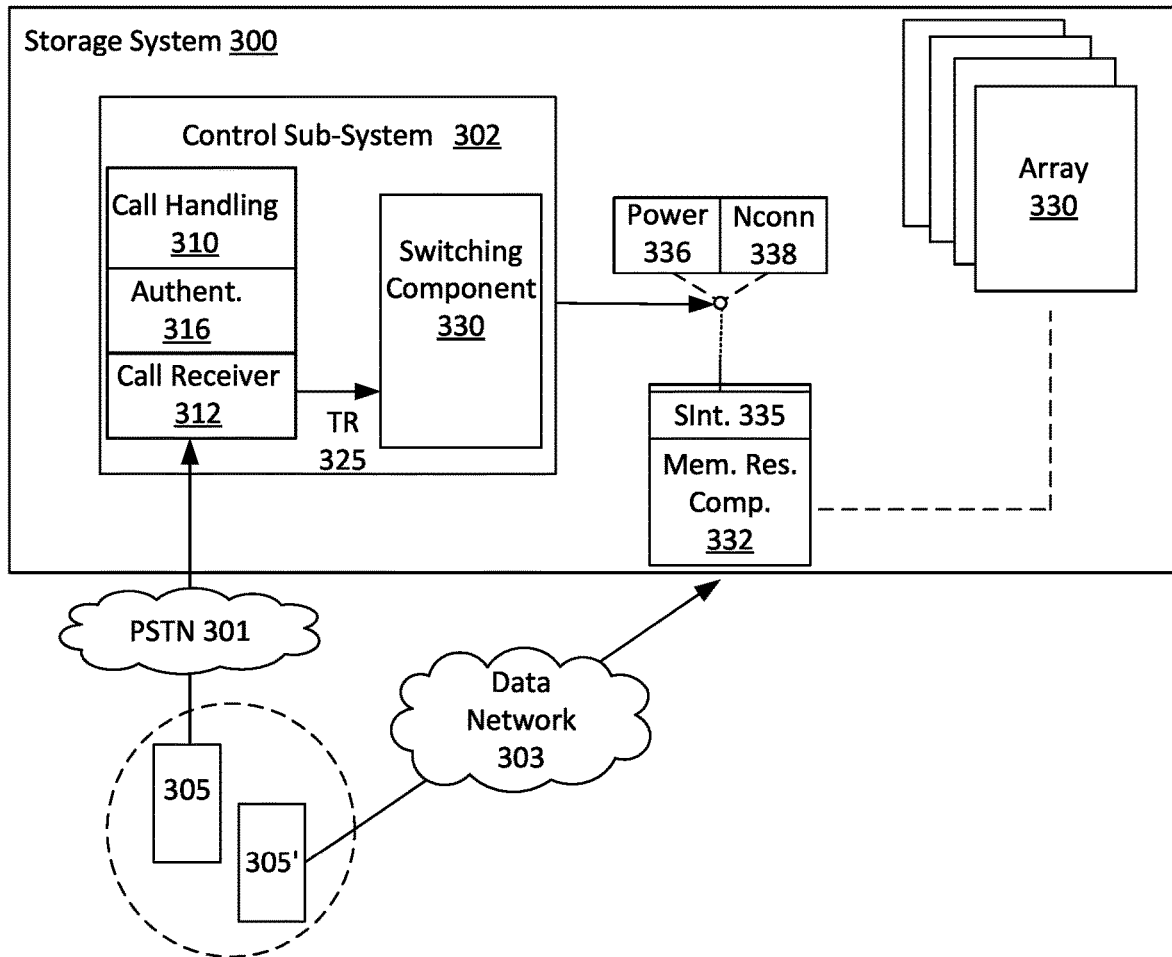
FIG. 3 illustrates an example method for storing sensitive data using a discrete on-demand memory resource.

FIG. 3 illustrates another example of a storage system, according to one or more embodiments. In an example of FIG. 3, a storage system 300 includes a control sub-system 302 and an array of memory resource components 330. In an example of FIG. 3, the array 330 includes a plurality of memory resource components 332, with each memory resource component being associated with a specific account and/or identifier. In examples, the memory resource components 332 of the array 330 are disabled by default. The control sub-system 302 uses an incoming phone call from a user to enable a corresponding memory resource component 332 associated with the incoming call to be accessible to the user via a data network 303.

In examples, the memory resource components 332 of the array 330 are physically separated from one another. In variations, each memory resource component 332 includes a discrete memory resource, such as described with an example of FIG. 1. In some variations, the memory resource component 332 can include an associated memory access controller that can receive read operation commands from another computing source. In variations, the memory resource component 332 can correspond to a micro-computer. In other examples, the memory resource components 332 can share resources, such as a central processor that accesses discrete memory resources of the respective memory resource components 332.

According to examples, the control sub-system 302 includes a call handling component 310 to receive incoming calls, and a switching component 320 that enables network access to specific memory resource component 332 of the array 330 that are identified by respective incoming calls. As described with some examples, the call handling component 310 can identify a memory resource component 332 of the array 330 from an incoming call initiated by the user device 305. The switching component 320 can implement a switching operation or action to enable the memory resource component 332 identified by the incoming call to be accessible over a data network (e.g., IP network, the Internet).

In some examples, the switching component 320 is implemented as a mechanism that closes an airgap, in order to enable an identified memory resource component 330 to be accessible on a data network. In variations, the switching component 320 is implemented as a mechanism that electrically connects the identified memory resource component 332.

In more detail, the call handling component 310 may be accessible to user devices (or collection of user devices) over a telephony connection. In some examples, the call handling component 310 is accessible over a Public Switch Telephony Network ("PSTN") 201 to receive telephony calls from a telephony-enabled user device 305. The call handling component 310 can include, for example, a receiver 312 to receive the incoming call. The receiver 312 can initiate one or more processes in response to the incoming call. Additionally, the receiver 312 can convert the incoming call to a digital output that identifies a specific account.

Once the call is authenticated, a memory resource component 332 that is associated with an account of the user can be enabled for access over a data network (e.g., IP network, Internet). In examples, the memory resource component 332 can be switched from an unconnected state to a connected or activated state, where, for example, network connectivity and/or power is provided to the memory resource component 332. Thus, for example, the user can operate a computing device (e.g., the telephony-enabled computing device 332, or another user device) to access the memory resource component 332 over the data network.

In some variations, the receiver 312 includes caller authentication logic 316. The receiver 312 can execute the caller authentication logic 316 to authenticate the caller based on one or more signal characteristics carried by the incoming call signal. The caller authentication logic 316 can include, for example an authentication data store that stores authentication tokens (e.g., number passcode, password, answers to secret questions, etc.) for each user account (e.g., for individual account identifiers). Depending on implementation, the receiver 312 can identify one or more authentication data items and an account identifier from an incoming call, and then perform a comparison operation to compare the authentication item with a stored token of the account identifier. In one implementation, the caller authentication logic 316 processes a sequence of acoustic tones, where the sequence correlates to numbers of a dial pad that a user is interfacing with on the respective user device 305. In another implementation, the receiver 312 implements the caller authentication logic 316 to perform recognition of a user's voice input, to determine, for example, utterances of the user corresponding to a number, password, or secret. Still further, the receiver 312 can implement the caller authentication logic 316 to recognize the user's voice.

Still further, the memory resource component 332 of the array 330 includes a switch interface 335 that can selectively link to at least one of a power resource 336 or a network communication resource 338. The power resource 336 can correspond to a battery, a power inlet, or a power bridge that is shared with other memory resource components 332 of the array 330. In some variations, the network communication resource 338 can correspond to a data port and/or transceiver for receiving network communications over a data network (e.g., Internet Protocol (IP) network, the Internet). In other variations, the network communication resource 338 can include a data port and link for an external gateway to a data network (e.g., the Internet).

The call handling component 310 can respond to an incoming call by generating a trigger signal 325 for the switching component 320. According to examples, the trigger signal 325 (i) identifies the particular memory resource component 332 that is associated with an identifier provided by the incoming call, and (ii) forms a connection 334 (e.g., closes an airgap or electrical switch) to link the memory resource component 332 to the power resource and/or the network communication resource 338 via the switch interface 335 of the memory resource component 332. The connection 335 enables the identified memory resource component 332 to be accessed by the user device 305 over the data network 303. In some variations, the switching component 320 can be implemented as a mechanism that responds to the trigger signal 325 by forming the connection 335 using the switch interface 335 of the identified memory resource component 332 and the corresponding network communication resource 338. The connection 335 enables the user to access the memory resource component 332 over the corresponding data network 303 (e.g., IP network, the Internet, etc.).

As an addition or variation, the switching component 320 can be implemented as a mechanism that responds to the trigger signal 325 by forming the connection 335 to connect the memory resource component 332 to the power resource 336. In such examples, the switching component 320 forms the connection 335 to enable the memory resource component 332 to be accessible (e.g., available for read operations) using a network communication resource of that memory resource component 332.

In some examples, the switching component 320 can include timing logic that maintains the formed connection for the identified memory resource component 332 for a duration of time following, for example, the respective incoming call connection being made or terminated. As an addition or variation, the switching component 320 can communicate with the receiver 312 to detect when the incoming call is received and terminated. The switching component 320 can then maintain the connection that enables access to the identified memory resource component 330 for a duration that correlates to when the incoming call is received and terminated. Still further, in other variations, the switching component 320 can implement logic to form the connection for enabling the identified memory resource component 332 upon the respective incoming call being received. The switching component 320 can terminate the connection for enabling the memory resource component 332 upon the receiver 312 receiving a second call that specifies the identified memory resource 332.

In some examples, the call handling component 310 can be implemented as a server, or combination of servers, which match an incoming phone number to a port identifier that is assigned to the memory resource component 332. The call handling component 310 can implement the authentication logic 316 to authenticate the caller. Once the caller is authenticated, the call handling component 310 generates the trigger signal 325 for the switching component 320. In one implementation, the switching component 320 responds to the trigger signal 325 by connecting the network communication resource 338 to the port identified by the incoming call. The switching component 320 can, for example, implement an A/B gang relay that links the port corresponding to the identified memory resource component 332 to the network communication resource 338.

Figure 4:
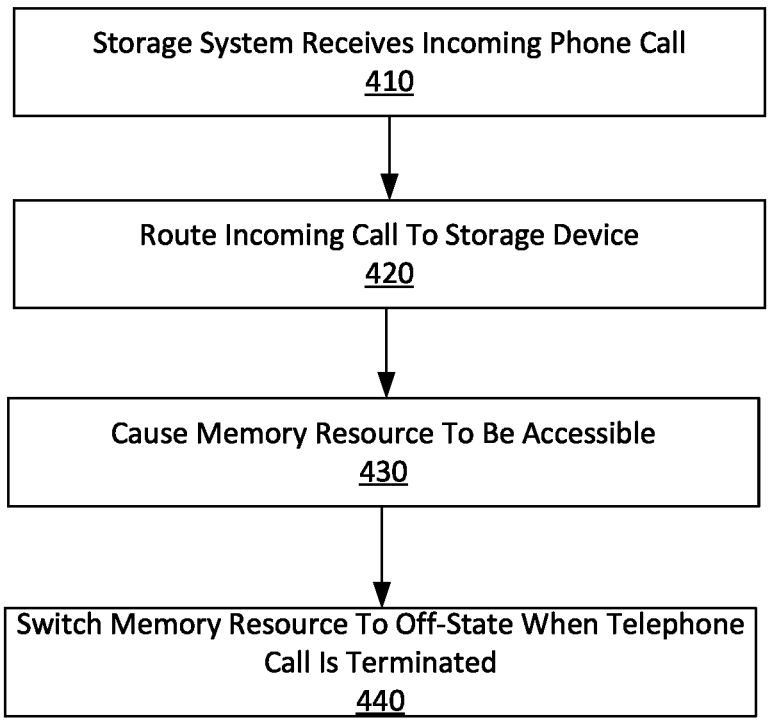
FIG. 4 illustrates a method for providing a storage module that is inaccessible until remotely activated using a non-IP network communication channel or link.

FIG. 4 illustrates a method for providing a storage module that is inaccessible until remotely activated using a non-IP network communication channel or link. A method such as described with an example of FIG. 4 may be implemented using, for example, a storage system such as described with an example of FIG. 2A through FIG. 2E. Accordingly, reference may be made to elements of FIG. 2A through FIG. 2E for purpose of illustrating suitable components for performing a step or sub-step being described.

With respect to an example of FIG. 4, storage system 200 receives an incoming telephone call (410). The incoming telephone call may be received over the PSTN network. In variations, the storage system 200 receives an incoming communication over another type of non-IP network. For example, the storage system 200 may directly interface with an analog network or communication medium, which in turn may be accessible to other types of networks (e.g., the Internet).

The system 200 may route the incoming telephone call to one of multiple available storage modules 210, based on the telephone number associated with the incoming telephone call (420). Once the telephone call is routed and the call connection is made, the memory resource 218 of the selected storage module 210 may be switched from an unconnected state to a connected or activated state. In one implementation, the storage module 210 is powered when in the connected or activated state. As an addition or variation, the storage module 210 is accessible over an IP-network (e.g., the Internet) when in the connected or activated state. Conversely, the storage module 210 may be unconnected or without power when the unconnected state.

In one example, the storage module 210 uses the incoming telephone call to supply electrical input to the memory resource 218, thereby causing the memory resource 218 to become available (e.g., in the on-state). For example, the signal interface 216 can draw power from the call receiver 212 when the incoming telephone call is received, and the drawn power can be signaled over the electrical input line 219 to the memory resource 218.

In another example, the storage module 210 physically manipulates the memory resource to make contact with an electrical input line. For example, the signal interface 216 may correspond to a robotic component that manipulates the orientation of the memory resource 218 relative to the storage module 210, in order to cause physical contact between the electrical input line 219 (or switch thereto) and the memory resource 218.

The electrical input signal causes the memory resource 218 to be accessible for a duration that can be determined by the incoming telephone call (430). When accessible, the memory resource 218 is accessible over an IP channel 231, so that it can be read or written to by a remote terminal. In variations, the duration can be determined from the telephone call, such as from user input (e.g., user enters DTMF command). Still further, the memory resource 218 may be accessible for a duration that is determined by the user input, received from, for example, the IP channel 231. Alternatively, the duration may be determined from a timer and/or predetermined condition.

In some examples, the telephone call to the storage module 210 is terminated, the memory resource 218 is switched to the off-state (440). In one example, the signal interface 216 terminates the electrical input provided over the electrical input line 219, as the signal interface 216 can no longer draw power from the call receiver 212. In a variation, the signal interface 216 responds to termination of the telephone call by manipulating the memory resource 218 relative to the storage device, to disconnect or force an air gap with an electrical input signal line. In this way, once the telephone call is terminated, the memory resource is switched to the off-state, so that it is no longer accessible over the IP channel 231.

While some examples provide for access to the storage device 200 to be terminated based on the incoming call (e.g., termination of incoming call causes termination of access to the memory resource), in variation, the termination to the memory resource 218 may be provided by other triggers or conditions. For example, access to the memory resource 218 may be terminated when the user makes a second call that is received by the call receiver 212. Alternatively, access to the memory resource 218 may be terminated by a timer condition (e.g., timer initiated when incoming call is received or terminated), after which access to the memory resource 218 is terminated. Still further, access to the memory resource 218 may be terminated in response to the user signaling a command over the IP channel 231 when access is present.

Figure 5:
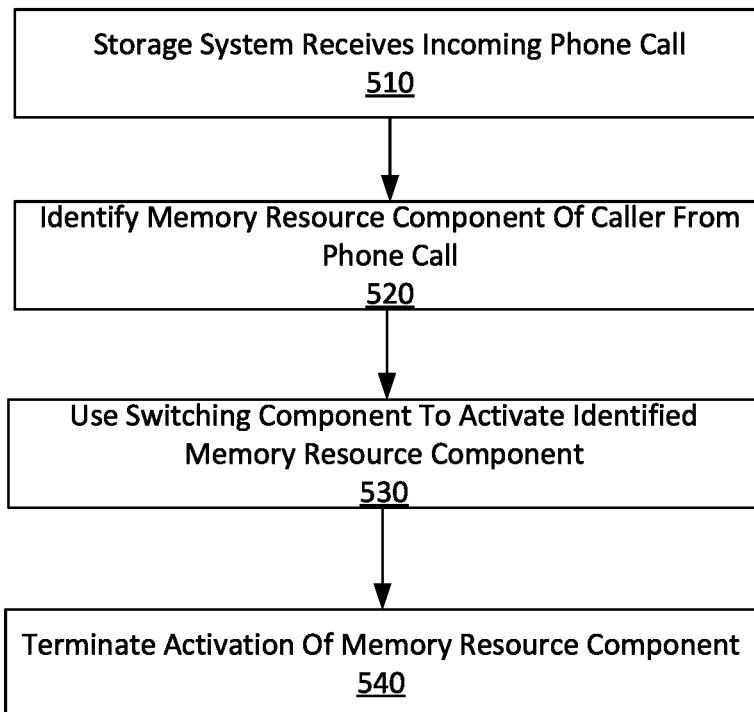
FIG. 5 illustrates a method for managing an array of memory resource components, where each memory resource component of the array is selectively activated through an initial connection made through a non-IP network channel or link.

FIG. 5 illustrates a method for managing an array of memory resource components, where each memory resource component of the array is selectively activated (e.g., switched to an on-state or otherwise connected to a network link) through an initial connection made through a non-IP network channel or link. A method such as described with an example of FIG. 5 may be implemented using, for example, a system such as described with an example of FIG. 3. Accordingly, reference may be made to elements of FIG. 3 for purpose of illustrating suitable components for performing a step or sub-step being described.

With respect to an example of FIG. 5, storage system 200 receives an incoming telephone call over the PSTN network, or alternatively, over another type of non-IP network (510). For example, the control sub-system 302 of the storage system 300 directly interfaces with an analog network or other communication medium, which in turn may be accessible to other types of networks (e.g., the Internet). By way of example, the incoming call may be received on a server control sub-system 302 that manages incoming phone calls, separate from the array of memory resource components 330.

Based on information determined from the call, the system 200 identifies the memory resource component 332 associated with the caller (520). In some examples, the memory resource component 332 is identified from the phone number that is used to access the storage system 300. As an addition or variation, the storage system 300 can use input from the user (e.g., sequence code, voice authentication) to authenticate that the caller is to have access to the identified memory resource component 332.

According to an example, the control sub-system 302 uses a switching component 320 to activate the memory resource component 332 identified by the incoming call (530). In some examples, the switching component 320 provides an airgap closure to each of multiple memory resources components 332 of the array 330. For example, each airgap closure may be implemented using an A/B gangway having a physical layer relay that can be programmatically triggered between open and closed states. The switching component 320 can utilize a switch management component (e.g., SWITCHMASTER R6100) to house and manage each switch, so that activation results in closure of the airgap corresponding to a particular memory resource component 332 identified by the incoming call. In some examples, the activation results in the corresponding memory resource component 332 being connected to the network communication resource 338 (e.g., Internet gateway), thereby enabling the memory resource component 332 to be accessible over the data network 303.

The control sub-system 302 may further terminate activation in response to a condition or event (540). For example, the control sub-system 302 may activate a particular memory resource component in response to receipt of a corresponding telephone call (e.g., phone call using phone number of particular memory resource 332). The activation of the memory resource 332 may also initiate a timer that deactivates the memory resource component 332 after a designated time period. As an addition or variation, the control sub-system 302 can deactivate the identified memory resource component 332 upon receiving a second phone call for the same phone number of the activated memory resource 332.

Client System And User Devices

Figure 6:
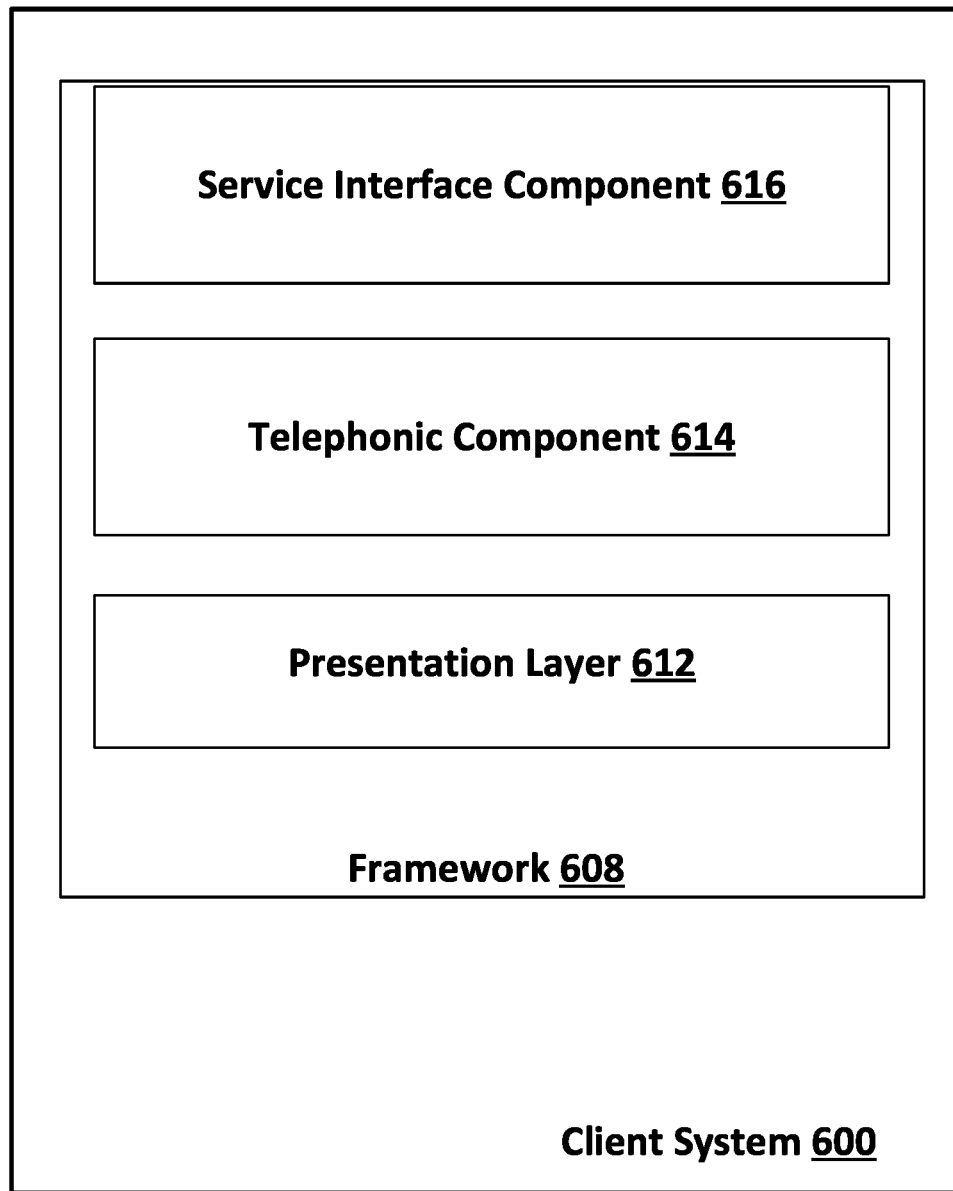
FIG. 6 illustrates a client system to access a remote memory resource component of a user account, according to one or more examples.

FIG. 6 illustrates a client system to access a remote memory resource component of a user account, according to one or more examples. A user of client system 600 may have authorization to access a memory resource component that is maintained by a storage system, such as described with an example of FIG. 3. Accordingly, reference may be made to elements of FIG. 3 for purpose of illustrating suitable components for use in implementing or using functionality and components described with an example of FIG. 6.

In an example, the client system 600 can be implemented by one or multiple computing devices of the user. For example, the client system 600 can be implemented using a telephony-enabled device and a browser-enabled device. In variations, the client system 600 can be implemented by a multi-purpose computing device that is capable of telephony and IP communications. According to examples, the client system 600 can include a programmatic component or interface that is provided for use with a service of storage system 300. For example, the client system 600 can be implemented using a service application that executes on the user's mobile computing devices. In variations, the client system 600 can be implemented by a platform, including applications, plug-ins, or other programmatic components that operate on multiple devices of the user.

According to an example, the client system 600 includes a presentation layer 612, a telephonic component 614, and a service interface component 616. Based on implementation, the components can be implemented through, for example, a service application on a single device, or distributed in whole or in part on multiple devices of a user. In some variations, the client system 600 also includes a framework 608, which implements rules with respect to the operations of the respective components.

In examples, the service interface component 616 can utilize one or more IP networks (e.g., Internet) to establish a communication channel with the storage system 300. In implementation, the service interface component 616 can include or be implemented as a browser component. In variations, the service interface component 616 can be implemented as an interface (e.g., plug-in, extension, etc.) for a local third-party browser of the client system 600. In such examples, the framework 608 can restrict use of the operations of the service interface component 616, such that the service interface component 616 has, or can be operated in a mode which is dedicated for communications with the storage system 300, under rules of framework 608. By way of example, the framework 608 can implement rules that result in functionality such as (i) dedicating the service interface component 616 to access a designated network site or location, as provided by the storage system 300 or other approved source; (ii) implementing encryption for any communication channel or exchange with the storage system 300; (iii) concealing the network address used to access the memory resource component 332 of the user; and/or (iv) restricting access to the service interface component 616 and/or storage system 300 without additional authentication being provided by a user (e.g., login and password credentials from user, biometric input through device of the service interface component 616, etc.).

In examples, the telephonic component 614 can enable telephony communications using a cellular or wireless receiver of a local user device. In variations, telephonic component 614 can be implemented as an interface to a phone application or resource for making a call connection on the computing device. In variations, the telephonic component 614 can interface with a voice service, such as a cellular voice service or a voice over Internet Protocol (VOIP) service. The framework 608 can also implement rules that restrict use or functionality of the telephony component 614. For example, the framework 608 can implement rules to (i) specify a phone number, and/or source for obtaining the phone number that can be automatically dialed through the presentation layer 612, to access the storage network 300; (ii) restricting use of the telephony component 614 to making call connections for only the designated phone number(s); and/or (iii) concealing the phone number that is being called from the user or other source.

In examples, the telephony component 614 can automate or facilitate additional functionality. For example, the telephonic component 614 can receive, or decode a signal from the storage system 300 that identifies a credential or the network address that the service interface component 616 is to use. In variations, the telephonic component 614 can also implement an authentication process using a local login or biometric credential of the user. The telephonic component 614 can also trigger execution of the service interface component 616, such that, for example, the service interface component 616 accesses the memory resource component 332 (or a service of the 300) using the corresponding network address, once a predetermined event is detected through the telephonic component 614 (e.g., the telephonic component 614 terminating initial phone call, the telephonic component 614 providing authentication credentials over call connection, etc.). Still further, the telephonic component 614 can receive or obtain the network address for the service interface component 616.

In variations, the presentation layer 612 can be provided as part of the platform or application(s) that run on device(s) of the client system 600. In an example, the client system 600 provides a call feature that the user can interact with in order to initiate a phone call to the remote site of the storage system 300 (or related service). Accordingly, in some examples, the user selects or otherwise interacts with the call feature provided through the presentation layer 612, without specifying a phone number that is linked to a remote site. In some examples, the service can change the phone number associated with the particular memory resource component 332 of the user. Moreover, in some variations, the phone number can be specific to the account or device(s) of the user. In variations, once the user interaction is received, the telephonic component 614 automatically identifies the phone number from an application memory. For example, the client system 600 can establish a background process that causes, for example, a service application or other program running on the user's mobile device to periodically receive check and/or update the current phone number that is to be used by the particular user. In other variations, the service application or other program of the client system 600 can acquire the phone number as a response to an event or condition, such as the user indicating a desire to access protected data stored with a service that uses or is provided with the storage system 300.

In examples, the client system 600 can initiate a timer based on a condition or event such as the call connection being made or terminated. In some examples, the service interface component 616 is able to use the network address to access the memory resource component 332 during a defined duration that is defined in part by the timer. As an addition or variation, the service interface component 616 can be enabled for a duration that extends until the user operates the telephonic interface 614 to make a second call connection to the service. While the service interface component 616 is enabled, the client system 600 can use the communication channel to access and use the memory resource component.

Figure 7:
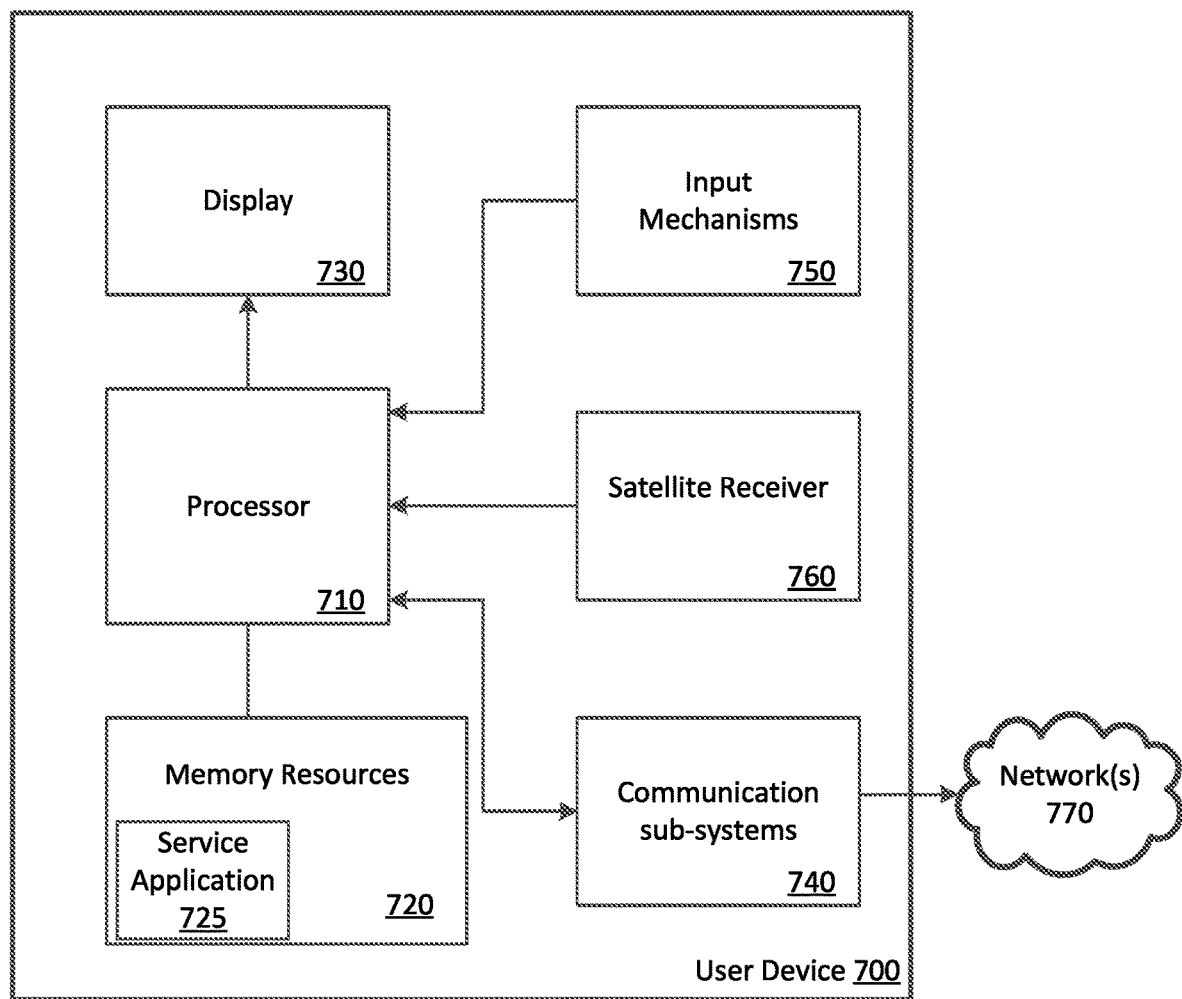
FIG. 7 is a block diagram that illustrates a computing device upon which examples described herein may be implemented.

FIG. 7 is a block diagram that illustrates a computing device upon which examples described herein may be implemented. In one embodiment, a computing device 700 may correspond to a mobile computing device, such as a cellular device that is capable of telephony, messaging, and data services. By way of example, the computing device 700 can correspond to a smartphone (or feature phone) on which an application ("app") can execute. In variations, the user device 700 can correspond to a tablet, ultraportable computing device, laptop or desktop computer.

The computing device 700 includes a processor 710, memory resources 720, a display device 730 (e.g., such as a touch-sensitive display device), one or more communication sub-systems 740 (including wireless communication sub-systems), one or more sensors 750 (e.g., accelerometer, gyroscope, barometer, altimeter, microphone, camera), and one or more location detection mechanisms (e.g., GPS component) 760. In one example, at least one of the communication sub-systems 740 sends and receives cellular data over both data channels (e.g., IP networks) and voice channels. The communications sub-systems 740 can include a cellular transceiver and one or more short-range wireless transceivers to enable (i) placement of a phone call, and (ii) communication with a remote service that utilizes a storage system such as described with FIG. 1 through FIG. 3.

The memory resources 720 can also store instructions for a service application 725 that can implement a client system for remotely accessing a memory resource component of a user, as described by examples of FIG. 6. In an example, the service application 725 initiates and automates communications with, for example, storage system 300. For example, the processor 710 can be configured with software and/or other logic to perform one or more processes, steps, and other functions described with client system 600 (see FIG. 6). For example, the service application 725 can run to provide telephonic component 614 (see FIG. 6) and service interface component 616 (see FIG. 6). Additionally, the service application 725 can provide presentation layer 612 (see FIG. 6) to enable, for example, programmatic use of a storage service provided with the storage system 300.

When installed and running on the mobile computing device 700, the service application 725 can implement functionality of client system 600, such as described by examples of FIG. 6. In examples, the service application 725 can be associated with an account identifier 711 and/or other credential information 715 that is specific to the user, user account or device (e.g., mobile device phone number).

The service application 725 can include processes for implementing the telephonic component 614 and the service interface component 616, as described with examples of FIG. 6. In implementation, the service application 725 can be configured to enable the service interface component 616 in response to an event and/or condition that is caused by the telephonic process 614, using the phone number to make the call connection. For example, the service application 725 can enable the service interface component 616 in response to one or more events that include the call connection being made, the user providing additional authentication information using the call connection, and/or the user terminating the call connection. In examples, the service interface component 616 is enabled once the user is authenticated during the phone call. For example, the service can communicate the network address to the application, and the service interface component 616 can utilize the address to access the remote service once the user is authenticated during the call connection. The service interface component 616 can establish, for example, an Internet Protocol data communication channel with the service.

In examples, a user can access data stored on the user's memory resource component 332, as hosted by the storage system 300, by launching the service application 725. Once launched, the service application 725 automatically or programmatically (e.g., in response to a single user input) makes a call connection to the storage system 300, using a unique phone number that is specific to the user or account. From the call connection, the user can be provided a duration of time during which the service application 725 can be used to access the memory resource component 332. In variations, the user can utilize a phone number that contacts the 300, and then subsequently provide additional authentication information to enable network access to the memory resource component 332 of the user or account. Once access to the memory resource component 332 is enabled, the service application 725 can be used to access the memory resource component 332. The service application 725 can, for example, implement a browser process to make the network connection with the memory resource component 332, by automatically acquiring and/or using the network address for locating the memory resource component 332 over one or more IP networks.

While examples provide for the client system 600 and/or mobile computing device 700 to be operated by a user, in variations, the user can correspond to a group of users (e.g., enterprise). In such variations, an administrator, for example, can provide the mobile computing device 700 with a set of credentials and/or other identifiers (e.g., phone number for use in contacting the storage system 300). The administrator can also provide the individual user with additional credentials for locally authenticating the user, and/or authenticating the user with the storage system 300. In this way, the memory resource component 332 can be shared amongst multiple users.

In examples, the service application 725 can generate a user interface that indicates a status of a memory resource component 332 that is assigned to the user. The user can interact with the service application 725 to activate the memory resource component 732. For example, the user can initiate a trigger for the telephonic component 614 (see FIG. 6) through the service application 725 to cause the mobile computing device 700 to initiate a telephony call to a storage service that is provided with storage system 300. In variations, the service application 725 can execute to generate DTMF tones (or other analog input) for the storage service. In this way, the service application 725 can identify and/or authenticate the user to the storage service. Once the user is identified and authenticated, the service application 725 can use the service interface component 616 to establish a data connection with the storage service. The data connection can be used to generate content for the presentation layer 612 (see FIG. 6) to, for example, view contents of the memory resource component, such as, for example, a value of a user's current crypto-currency.

In some variations, the operations of the service application 725 following an initial user trigger can be substantially automated. For example, the service application 725 can monitor the telephony connection for an acknowledgement that the memory resource component 332 that is assigned to the user has been activated, then automatically perform operations that establish the connection with the memory resource component 332 over the data network. Likewise, the computing device 700 may execute to monitor for one or more events (e.g., passage of time) that result in termination of the memory resource activation, and/or cause the mobile computing device to generate a command to terminate the activation.

Figure 8:
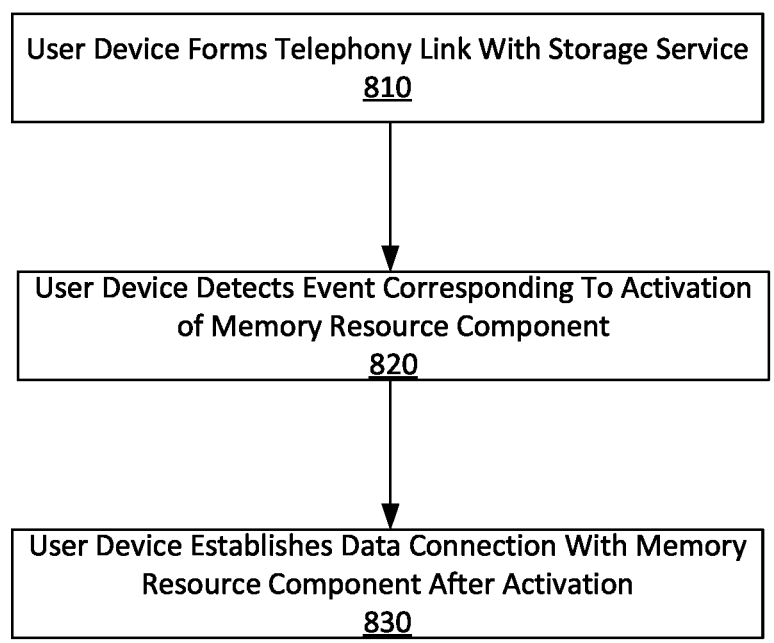
FIG. 8 illustrates a method for operating a computing device of a user to access a service that provides a memory resource component to store sensitive data of the user, according to one or more examples.

FIG. 8 illustrates a method for operating a computing device of a user to access a service that provides a memory resource component to store sensitive data of the user, according to one or more examples. A method such as described with an example of FIG. 8 may be implemented using, for example, a client system such as described with an example of FIG. 6, or a mobile computing device such as described with an example of FIG. 7. Accordingly, reference may be made to elements of FIG. 6 and FIG. 7 for purpose of illustrating suitable components for performing a step or sub-step being described.

With reference to an example of FIG. 8, a user can operate client system 600 to make a call connection (e.g., place a phone call) with a storage service that is provided in conjunction with storage system 300 (810). In examples, the client system 600 can be implemented using the mobile computing device 700, executing the service application 725. In such examples, the service application 725 can be used to place a phone call to a storage service provided by the storage system 300. using telephony resources of the computing device. For example, the service application 725 may execute to transparently initiate a phone call via phone application and cellular telephony capabilities of the computing device. In variations, the user may place the phone call to store system 300 as a separate action or event. For example, the user can place the phone call to storage system 300 before the user launches the service application 725. Still further, in other variations, the user may use a first device (e.g., mobile computing device 700) to make the call connection, and a second device (e.g., browser device) to form a communication channel over one or more IP networks. In either of the variations, the memory resource component 332 that corresponds to the phone number used for placement of the phone call can be identified and activated as a result of the call connection.

When the call connection is made, the user and/or the mobile computing device 700 can specify additional input to authenticate the user. For example, the computing device 700 can automatically generate a sequence of tones that correspond to a passcode of the user. Alternatively, the user may be prompted to provide an utterance, either by the computing device 700 and/or by the system 300.

In some examples, the service application 725 can execute on the computing device 700 to detect one or more events corresponding to activation of the memory resource component 332, as identified by the phone number and/or other input provided over the telephony link of the call connection (820). The detected event may correspond to, or indicate the availability of the memory resource component 332. In some examples, the control sub-system 302 generate one or more audible sounds to programmatically communicate the status of the memory resource component 332 which is to be activated. The computing device 700 may execute the service application 725 to detect and interpret the audible communications generated by, for example, the control sub-system 302.

Once the computing device 700 detects the event (e.g., memory resource component 332 is activated), the computing device 700 can establish a communication channel over the data network 303 (e.g., the Internet) with the identified memory resource component 332 (830). In some examples, the establishment of the connection over the data network 303 can be done automatically, such as in response to detecting audible acknowledgment over the telephony link that the memory resource 332 for the identified phone number has been activated.

Network Isolation Device

Figure 9:
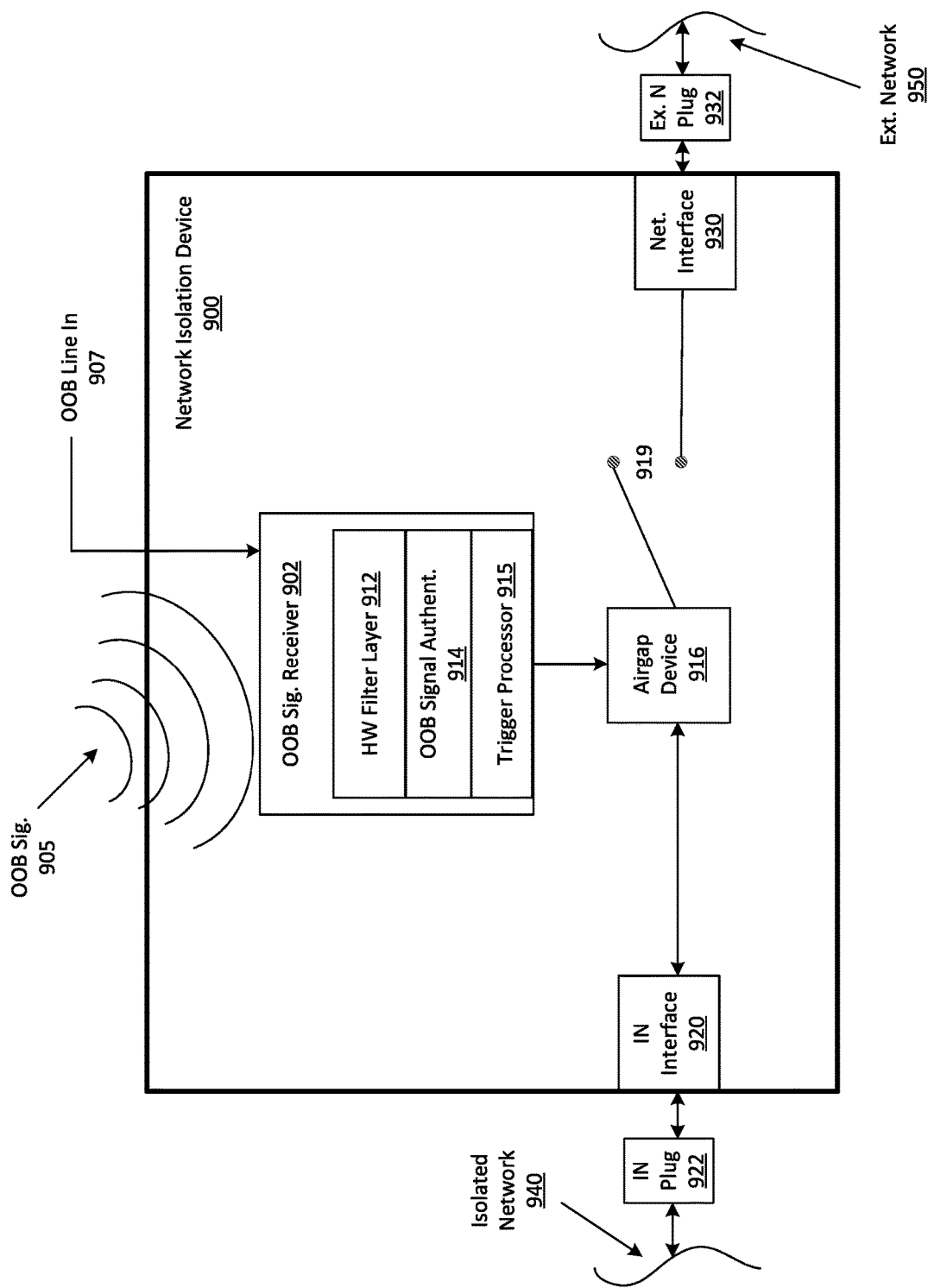
FIG. 9 is a block diagram illustrating a network isolation device, in accordance with examples described herein.

FIG. 9 is a block diagram illustrating a network isolation device 900, in accordance with examples described herein. As provided herein, the air gap-based network isolation device 900 includes hardware componentry for isolating downstream networks and computing devices from external networks 950, such as Internet Protocol-based networks. The network isolation device 900 includes an out-of-band signal receiver 902 coupled to an airgap device 916 (e.g., a mechanical relay, actuator, or optocoupler) that closes and opens a physical air gap 919 in response to an out-of-band wireless signal 905 or an out-of-band signal received through an out-of-band line 907 coupled to the out-of-band signal receiver 902. As provided herein, the "out-of-band" signal can comprise a signal utilizing a different communication protocol that that of the external network 950. For example, when the external network 950 comprises an IP-based network, such as the Internet, the out-of-band signal 905 can comprise any non-IP-based signal, such as a non-IP radio signal, a LoRa signal, an SMS message, a PSTN signal, a cellular signal, and the like.

In various implementations, the out-of-band signal 905 can be wirelessly transmitted or broadcasted from an authorized signal source (e.g., a mobile computing device, a LoRa signal generator, etc.), and can comprise an encrypted communication (e.g., a short message service (SMS) message or a modulated spread spectrum LoRa signal) which can be processed by an out-of-band signal receiver 902 of the network isolation device 900 to control the airgap device 916 that physically opens and closes the air gap 919. Additionally or alternatively, the out-of-band signal can be received through a wire via an out-of-band line 907 coupled to the out-of-band signal receiver 902. In one example, an internal network 940 (e.g., an Ethernet network utilizing an Internet Protocol (IP)) may be isolated from the external network 950 (e.g., the Internet) using the network isolation device 900 as an access point to the internal network 940. As an example, the internal network 940 can be comprised of computing devices, memory resources, and/or other digital assets of any entity that desires increased security that isolates its computing devices from other networks in an on-demand manner using the out-of-band signal authentication techniques described throughout the present disclosure.

The network isolation device 900 can include an internal network interface 920, such as a universal serial bus (USB) port and/or R345 port, that connects the network isolation device 900 to the internal network 940. Accordingly, the internal network interface 920 may be mated with a corresponding internal network plug 922 that provides the physical connection to the network isolation device 900. The network isolation device 900 can further include a second network interface 930, such as a universal serial bus (USB) port and/or R345 port, that connects the network isolation device 950 to an external network 950 (e.g., the Internet) using a corresponding external network plug 932. As provided herein, the external network 950 and internal network 940 are physically connected and disconnected via an air gap 919 that is opened and closed through control of the airgap device 916 by the signal receiver 902.

As described herein, the signal receiver 902 can include a dedicated hardware signal filter 912 that provides an initial analog authentication layer for an incoming wireless access signal 905 or access signal received via the out-of-band line 907. In some aspects, the hardware signal filter 912 can comprise a specialized chip comprising a hardware representation of an encryption and/or decryption algorithm that prevents unwanted access to signal authentication software executing on the signal receiver 902. Accordingly, a detected signal by the signal receiver 902 may be first processed by the hardware filter 912 before the signal is permitted to be processed by a signal authenticator 914 of the signal receiver 902.

As an addition or an alternative, the signal receiver 900 can include a signal authenticator 914, such as a digital signal processor or other processing device executing authentication or decryption instructions to authenticate the out-of-band access signal. Upon receiving the signal, the signal authenticator 914 can perform an authentication process to determine whether the signal is from an authorized source and/or includes an authorized access code. The signal authenticator 914 may do so using any type of suitable authentication technique(s), a such as code decryption and/or device identifier verification technique.

Once authenticated, a trigger processor 915 of the signal receiver 902 can control the airgap device 916 to close the air gap 919 and connect the internal network 940 to the external network(s) 950. As an on-demand device, the network isolation device 900 can be controlled remotely using any type of out-of-band signal that corresponds to the signal receiver 902. As an example, the signal receiver 902 may receive an SMS message from a particular phone number that includes a specified code for authentication. The hardware signal filter 912 can pre-process the SMS message (e.g., verify that it came from a correct phone number or an authorized device identifier). Upon initial verification by the hardware filter 912, the SMS message may be further processed by the signal authenticator 914 of the signal receiver 902, which can, for example, verify a secondary code embedded in the message (e.g., via a decryption algorithm). Once verified, the signal receiver 902 can control the airgap device 916 to close the air gap 919 and enable access or open the air gap 919 to remove access to the internal network 940.

One particular implementation contemplated is the use of LoRa technology to open and close the air gap 919. LoRa technology involves the use of low power, long range radio frequency transmissions utilizing spread spectrum modulation (e.g., chirp spread spectrum (CSS) modulation) to encode signals. Accordingly, a LoRa signal generator may use common battery power (e.g., AA or AAA batteries) which can power the LoRa signal generator for long periods of time (e.g., years) without replacement. As an example, an enterprise having a sensitive internal network 940 of computing devices, memory resources, and/or other digital assets may utilize a single LoRa signal generator to connect and disconnect its internal network 940 from the external network 950 as needed. The LoRa signal generator can encode an out-of-band LoRa signal 905 using CSS modulation and transmit or broadcast the signal 905 such that it is detectable by the signal receiver 902. The signal receiver 902 then decrypts or decodes the LoRa signal, authenticates the LoRa signal generator and/or the LoRa signal itself, and controls the airgap device 916 to open or close the air gap 919 on-demand.

Methodology

Figure 10:
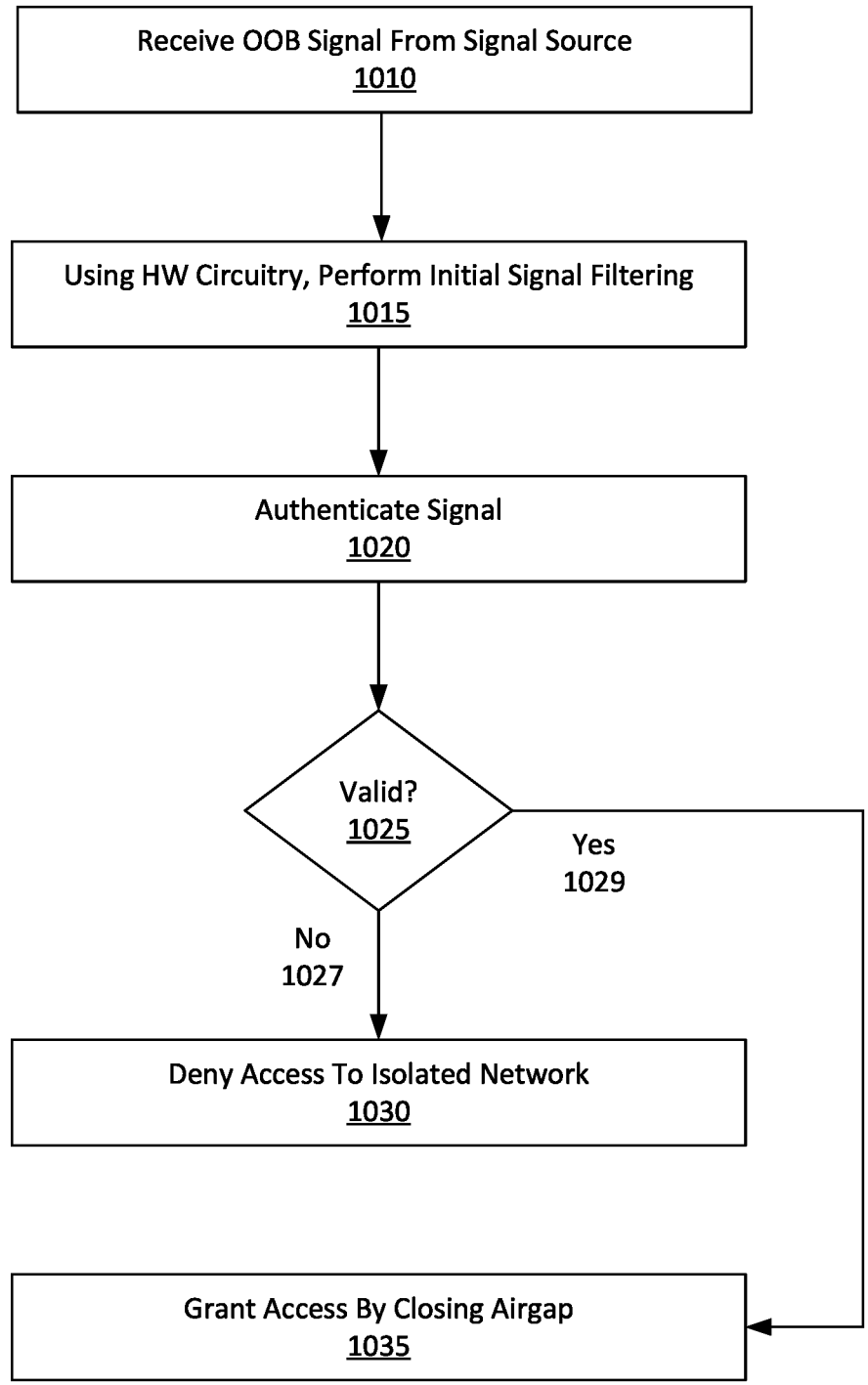
FIG. 10 is a flow chart describing a method of authenticating an out-of-band signal to connect an isolated network to an external network, according to examples described herein.

FIG. 10 is a flow chart describing a method of authenticating an out-of-band signal to connect an isolated network 940 to an external network 950, according to examples described herein. In the below description of FIG. 10, reference may be made to reference characters representing like features as shown and described with respect to FIG. 9. Furthermore, the processes described in connection with FIG. 10 may be performed by an example network isolation device 900 as shown and described with respect to FIG. 9. Still further, any the steps shown in the flow chart of FIG. 10 may be omitted or rearranged to precede or follow any other step.

Referring to FIG. 10, the network isolation device 900 can receive an out-of-band signal (e.g., out-of-band wireless signal 905 or signal received via the out-of-band line 907) from a signal source (1010). As provided herein, the out-of-band signal can comprise any signal that corresponds to the signal receiver 902 of the network isolation device 900, and can utilize a communication protocol that is distinct from the communication protocol(s) utilized by the external network 950. In some examples, the signal receiver 902 can include a hardware signal filter 912 that pre-processes the incoming signal and acts as an initial filter prior to decoding, decrypting, or otherwise verifying the signal or source of the signal (1015). If the signal does not satisfy the hardware filter layer 912 of the signal receiver 902, then the process ends, and no further authentication is performed. However, if the signal does satisfy the hardware filter layer 912, then a signal authenticator 914 of the receiver 902 can further process the signal 905 through decoding, decryption, or other verification techniques described herein (1020).

The signal authenticator 914 may then determine if the signal 905 and/or signal source is valid (1025). If not (1027), the signal receiver 902 denies access to the isolated network 940 by maintaining the air gap 919 in an open state (1030). However, if the signal and/or signal source is valid (1029), then the signal receiver 902 controls the airgap device 916 to close the air gap 919 and connect the isolated network 940 to the external network 950 (1035). To isolate the internal network 940 from the external network 950, the same or a similar authentication process is performed to verify the signal 905 and/or signal source and open the air gap 919 accordingly.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network isolation device comprising:
an internal network interface to connect the network isolation device to an internal network;
an external network interface to connect the network isolation device to an external network;
an airgap device that operates to (i) close an air gap to connect the internal network to the external network, and (ii) open the air gap to disconnect the internal network from the external network; and
a signal receiver comprising one or more processors executing instructions that cause the signal receiver to:
receive a message from a user of a group of multiple users, the message including an access code;
authenticate the message based at least in part on the access code; and
in response to receiving and authenticating the message from the user of the group of multiple users, make the internal network accessible to the group of multiple users over the external network by closing the airgap device, so as to and connect the internal network to the external network.

2. The network isolation device of claim 1, further comprising:
a hardware signal filter that performs an initial authentication process on the message prior to determining whether the user of the message is authorized.

3. The network isolation device of claim 1, wherein the external network communicates using a first communication protocol, and wherein the received message utilizes a second communication protocol that is different from the first communication protocol.

4. The network isolation device of claim 3, wherein the first communication protocol comprises an Internet Protocol.

5. The network isolation device of claim 3, wherein the second communication protocol comprises at least one of a cellular communication protocol, a short message service communication protocol, a LoRa communication protocol, or a non-IP-based radio communication protocol.

6. The network isolation device of claim 1, wherein the internal network interface and the external network interface comprise at least one of a universal serial bus port or a RJ45 port.

7. The network isolation device of claim 1, wherein the internal network comprises a set of one or more computing devices, memory resources, or digital assets of an entity.

8. The network isolation device of claim 1, wherein the airgap device comprises one of a mechanical relay, an actuator, or an optocoupler.

9. A non-transitory computer readable medium storing instructions that, when executed by one or more processors of a network isolation device, cause the one or more processors to:
operate an internal network interface for connecting the network isolation device to an internal network;
operate an external network interface for connecting the network isolation device to an external network;
operate an airgap device for (i) closing an air gap to connect the internal network to the external network, and (ii) opening the air gap to disconnect the internal network from the external network;
receive a message from a user of a group of multiple users, the message including an access code;
authenticate the message based at least in part on the access code; and in response to receiving and authenticating the message from the user of the group of multiple users, make the internal network accessible to the group of multiple users over the external network by closing the airgap device, so as to connect the internal network to the external network.

10. The non-transitory computer readable medium of claim 9, wherein the network isolation device comprises a hardware signal filter that performs an initial authentication process on the message prior to the user of the message being authorized.

11. The non-transitory computer readable medium of claim 9, wherein the external network communicates using a first communication protocol, and wherein the received message utilizes a second communication protocol that is different from the first communication protocol.

12. The non-transitory computer readable medium of claim 11, wherein the first communication protocol comprises an Internet Protocol.

13. The non-transitory computer readable medium of claim 11, wherein the second communication protocol comprises at least one of a cellular communication protocol, a short message service communication protocol, a LoRa communication protocol, or a non-IP-based radio communication protocol.

14. The non-transitory computer readable medium of claim 9, wherein the network isolation device includes an internal network interface that connects the network isolation device to the internal network and an external network interface that connects the network isolation device to the external network, and wherein the internal network interface and the external network interface comprise at least one of a universal serial bus port or a RJ45 port.

15. The non-transitory computer readable medium of claim 9, wherein the internal network comprises a set of one or more computing devices, memory resources, or digital assets of an entity.

16. The non-transitory computer readable medium of claim 9, wherein the airgap device comprises one of a mechanical relay, an actuator, or an optocoupler.

17. A computer-implemented method of providing network security, the method being performed by one or more processors of a network isolation device and comprising:
   operating an internal network interface for connecting the network isolation device to an internal network;
   operating an external network interface for connecting the network isolation device to an external network;
   receiving a message from a user of a group of multiple users, the message including an access code;
   authenticate the message based at least in part on the access code; and
   in response to receiving and authenticating the message from the user of the group of multiple users, making the internal network accessible to the group of multiple users over the external network by closing the airgap device, so as to connect the internal network to the external network.

18. The method of claim 17, wherein the network isolation device comprises a hardware signal filter that performs an initial authentication process on the message prior to determining whether the user of the message is authorized.

19. The method of claim 17, wherein the external network communicates using a first communication protocol, and wherein the received signal utilizes a second communication protocol that is different from the first communication protocol.

20. The method of claim 19, wherein the first communication protocol comprises an Internet Protocol.

* * * * *